(12) United States Patent
Dutta et al.

(10) Patent No.: US 6,615,212 B1
(45) Date of Patent: Sep. 2, 2003

(54) DYNAMICALLY PROVIDED CONTENT PROCESSOR FOR TRANSCODED DATA TYPES AT INTERMEDIATE STAGES OF TRANSCODING PROCESS

(75) Inventors: Rabindranath Dutta, Austin, TX (US); Matthew Francis Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/377,639

(22) Filed: Aug. 19, 1999

(51) Int. Cl.[7] .............................. G06F 17/30; G06F 7/00
(52) U.S. Cl. .............................. 707/10; 707/1; 707/101; 707/104.1; 707/200; 707/513; 709/201; 709/203; 709/233
(58) Field of Search ...................... 707/1–5, 100–104.1, 707/200–206, 10, 500–501.1, 511–513, 522–523; 709/200–248, 313, 305

(56) References Cited

U.S. PATENT DOCUMENTS

| | | | | |
|---|---|---|---|---|
| 5,513,323 A | * | 4/1996 | Williams et al. | 709/246 |
| 5,708,828 A | * | 1/1998 | Coleman | 709/216 |
| 5,754,830 A | | 5/1998 | Butts et al. | 709/311 |
| 5,847,957 A | | 12/1998 | Cohen et al. | 700/108 |
| 5,859,972 A | | 1/1999 | Subramaniam et al. | 709/203 |
| 5,861,883 A | | 1/1999 | Cuomo et al. | 345/733 |
| 5,862,220 A | * | 1/1999 | Perlnan | 380/21 |
| 5,877,759 A | | 3/1999 | Bauer | 709/317 |
| 5,884,097 A | | 3/1999 | Li et al. | 710/43 |
| 5,890,129 A | | 3/1999 | Spurgeon | 705/4 |
| 5,890,158 A | | 3/1999 | House et al. | 707/10 |
| 5,907,598 A | * | 5/1999 | Mandalia et al. | 379/100.01 |
| 5,918,013 A | * | 6/1999 | Mighdoll et al. | 709/217 |
| 6,154,738 A | * | 11/2000 | Call | 707/4 |
| 6,182,092 B1 | * | 1/2001 | Francis et al. | 707/101 |
| 6,247,048 B1 | * | 6/2001 | Greer et al. | 709/219 |
| 6,247,050 B1 | * | 6/2001 | Tso et al. | 709/224 |
| 6,311,215 B1 | * | 10/2001 | Bakshi et al. | 709/221 |

FOREIGN PATENT DOCUMENTS

| | | | |
|---|---|---|---|
| JP | 10187456 | 7/1998 | ........... G06F/9/445 |
| WO | WO 97/42728 | 11/1997 | |

OTHER PUBLICATIONS

Masahiro HOri et al., Annotation of Web content for transcoding, W3C note Jul. 10, 1999, pp. 1–15, www.w3.org/tr/annot/.*

Richard Han et al., transcoding of the Internet's multimedia content for universal access, excerpt from book"multimedia communications:directions & Innovations", chapter 15, ed.Jerry D.Gibson, Academic Press, 2000, pp. 1–10.*

(List continued on next page.)

*Primary Examiner*—Srirama Channavajjala
(74) *Attorney, Agent, or Firm*—Duke W. Yee; Jeffrey S. LaBaw; Michael R. Nichols (57) ABSTRACT

A method in a data processing system for providing content from a distributed database to a client. In a preferred embodiment, a transcoding proxy server receives a request for content from a client machine. The transcoding proxy server retrieves the content from an originating server. The retrieved content is provided in a first format type. In response to a determination that an increase in efficiency would be obtained by allowing the client to process the content in the first format type prior to transcoding the content into a second format type, the transcoding proxy server sends the content to the client in the first format type. Furthermore, in response to a determination that the client does not have content processing software for processing the content in the first format, the transcoding proxy server sends content processing software for the first format type along with the content in the first format type to the client. The transcoding proxy server then transcodes the content from the first format type into the second format type and sends the content in the second format to the client.

36 Claims, 5 Drawing Sheets

OTHER PUBLICATIONS

Bharadvaj, H et al., An active transcoding proxy to support mobile web access, Reliable distributed systems, 1998 proceedings, IEEE Oct. 1998, pp. 118–123.*

Han, R et al., Dynamic adaption in an image transcoding proxy for mobile web browsing, IEEE personal communications, Dec. 1998, pp. 8–17.*

Berg, C.; How Do I Display Media Formats That Netscape Does Not Support?; Dr. Dobb's Journal, vol 21, No. 10, pp. 111, 129, Oct. 1996—Abstract Only.

Kostler, et al.; Client Server Optimization For Multimedia Document Exchange; Database Systems for Advanced Applications '97 Proceedings of the Fifth International Conference, pp. Singapore, 1997—Abstract Only.

* cited by examiner

DYNAMICALLY PROVIDED CONTENT PROCESSOR FOR TRANSCODED DATA TYPES AT INTERMEDIATE STAGES OF TRANSCODING PROCESS

BACKGROUND OF THE INVENTION

1. Technical Field

The present invention relates to the field of computer software and, more specifically, to transcoding web based content from one format to another.

2. Description of Related Art

Internet, also referred to as an "internetwork," in communications, is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society, such as the Internal Revenue Service and secretaries of state. Operating costs may be reduced by providing informational guides and/or searchable databases of public records online.

Currently, the most commonly employed method of transferring data over the Internet is to employ the World Wide Web environment, also called, simply, "the Web." Other Internet resources also exist for transferring information, such as File Transfer Protocol (FTP), and Gopher. In the web environment, servers and clients effect data transactions using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page," is identified by a URL. The URL provides a universal, consistent method for finding and accessing this information by the web "browser." A browser is a program capable of submitting a request for information identified by a URL at the client machine. Retrieval of information on the web is generally accomplished with an HTML-compatible browser, such as, for example, Netscape Communicator, which is available from Netscape Communications Corporation.

When a user desires to retrieve a document, such as a web page, a request is submitted to a server connected to a client computer at which the user is located, and may be handled by a series of servers to effect retrieval of the requested information. The selection of a document is typically performed by the user selecting a hypertext link. The hypertext link is typically displayed by the browser on a client as a highlighted word or phrase within the document being viewed with the browser. The browser then issues a hypertext transfer protocol (HTTP) request for the requested documents to the server identified by the requested document's URL. The server then returns the requested document to the client browser using the HTTP protocol. The information in the document is provided to the client, formatted according to HTML. Typically, browsers on personal computers (PCs), along with workstations, are typically used to access the Internet. The standard HTML syntax of web pages and the standard communication protocol (HTTP) supported by the World Wide Web guarantee that any browser can communicate with any web server.

HTML format and HTTP protocol are not the only standards currently employed over the Web. There are many different data formats and file transfer protocols utilized on the Web. Furthermore, with the proliferation of wireless telephones, personal digital assistants, and other data processing systems with limited processing capabilities, needs for other file transfer protocols and formats have arisen to handle these devices, since these devices cannot handle many of the data formats utilized by other data processing systems. Therefore, transcoding proxy servers have been utilized to translate data formats such that devices configured to utilize different data formats are able to communicate with each other.

However, much of the information now available on the Web are legacy files created before the proliferation of the Internet and the Web. These files are often very large and were not created with the thought that they might someday be transmitted back and forth across the Internet. These files can take a very long time to transmit over the Web, and it can also take a very long time to transcode their contents into a different data format. Therefore, there is a need for an improved method of transcoding data formats and sending information across the web to minimize transmission times.

SUMMARY OF THE INVENTION

The present invention provides a method in a data processing system for providing content from a distributed database to a client. In a preferred embodiment, a transcoding proxy server receives a request for content from a client machine. The transcoding proxy server retrieves the content from an originating server. The retrieved content is provided in a first format type. In response to a determination that an increase in efficiency would be obtained by allowing the client to process the content in the first format type prior to transcoding the content into a second format type, the transcoding proxy server sends the content to the client in the first format type. Furthermore, in response to a determination that the client does not have content-processing software for processing the content in the first format, the transcoding proxy server sends content processing software for the first format type along with the content in the first format type to the client. The transcoding proxy server then transcodes the content from the first format type into the second format type and sends the content in the second format to the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
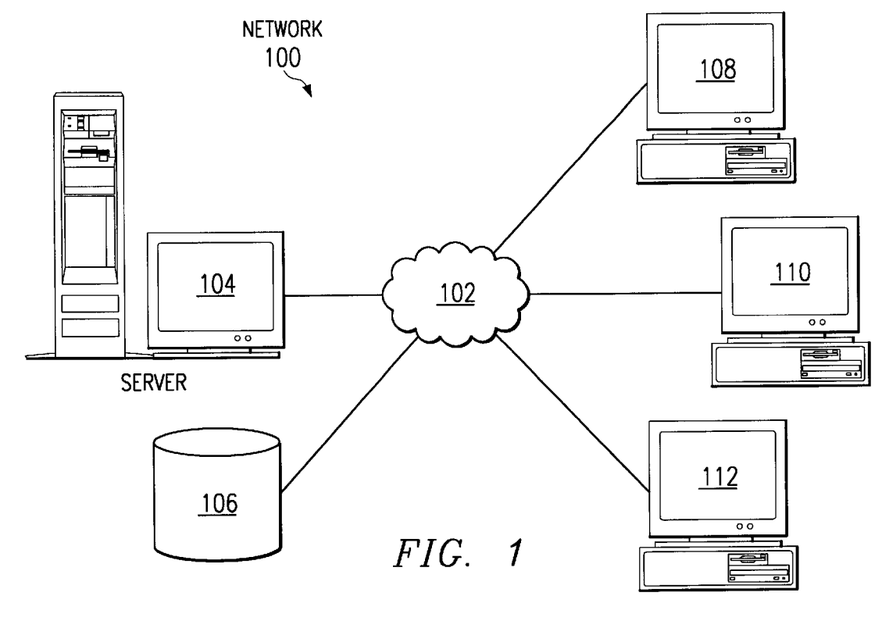
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network, which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
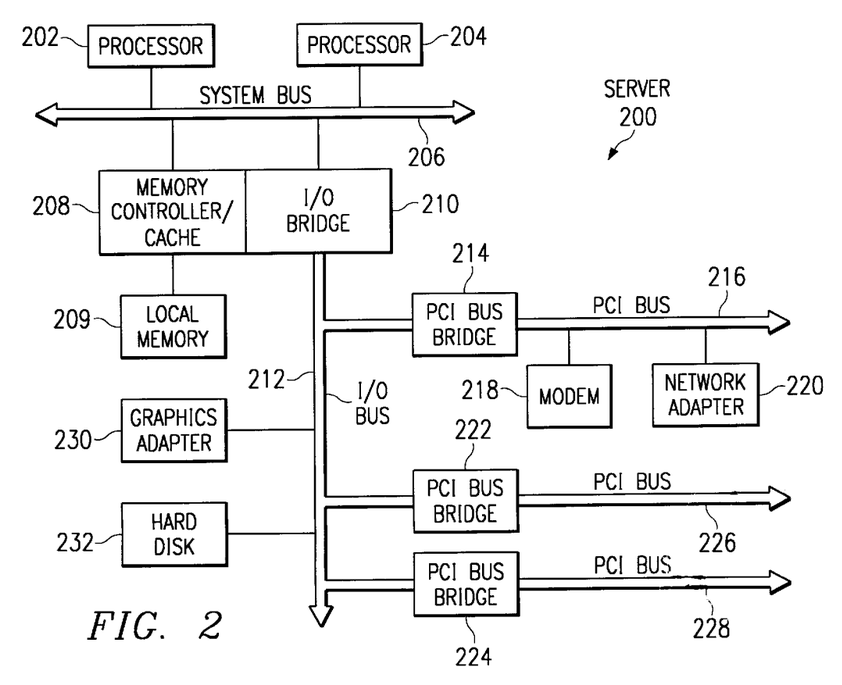
FIG. 2 depicts a block diagram of a data processing system that may be implemented as a proxy transcoding server or originating server in accordance with the present invention.

Referring to FIG. 2, a block diagram of a data processing system which may be implemented as a server, such as server 104 in FIG. 1, and utilized as a transcoding proxy server or originating server, is depicted in accordance with the present invention. (Note that an originating server is also referred to in literature as an origin server.) Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
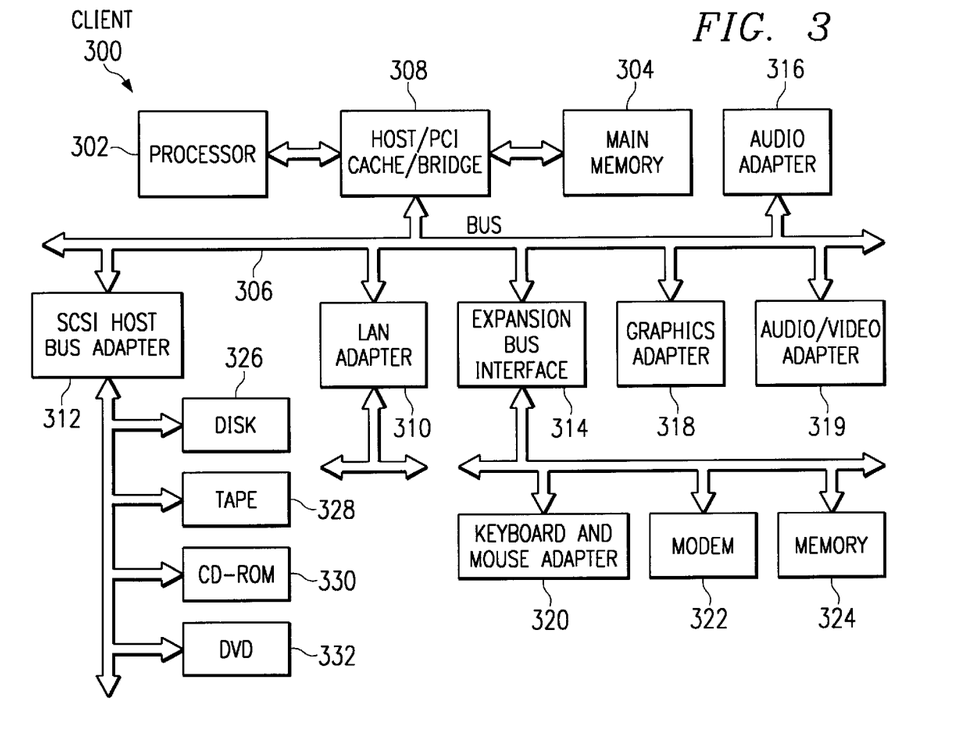
FIG. 3 illustrates a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. A Web browser is also typically run on the client computer. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
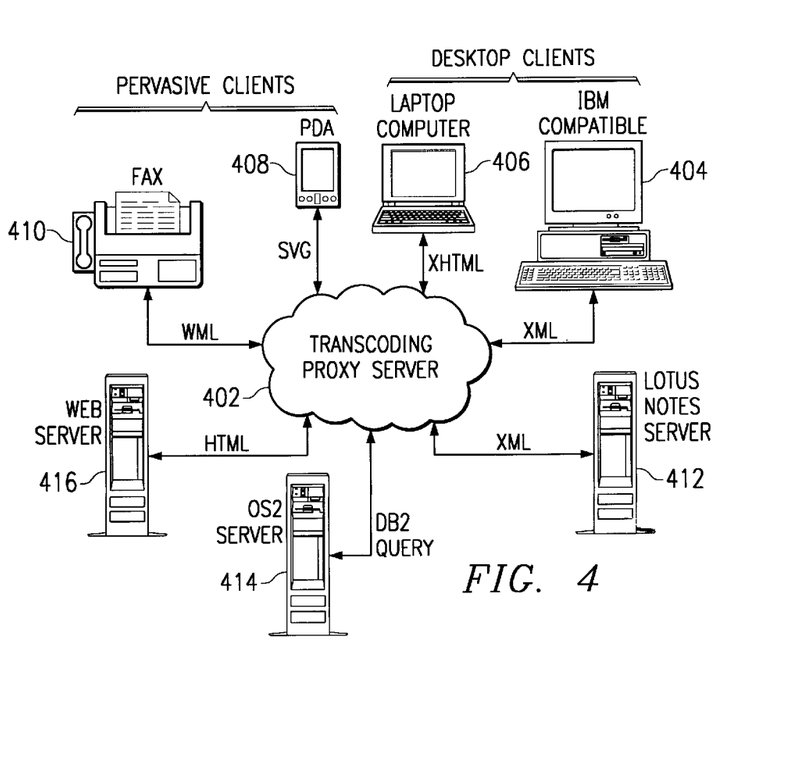
FIG. 4 is a pictorial representation illustrating the functioning of a proxy transcoding server.

With reference now to FIG. 4, there is shown a pictorial representation illustrating the functioning of a transcoding proxy server. Transcoding proxy server 402 is functionally connected to provide communication between clients 404, 406, 408 and 410 and originating servers 412, 414 and 416. In the depicted example, client 404 is a personal computer, client 406 is a laptop computer, client 408 is a personal digital assistant (PDA), and client 410 is a facsimile machine (FAX). Also in the depicted example, originating server 412 is a Lotus Notes server, originating server 414 is a DB2 server, and originating server 416 is a web server. It should be noted that other devices not shown could also be connected, and that some devices shown may not be connected in other embodiments.

Each of clients 404, 406, 408 and 410 use and support a different data format protocol for receiving and sending information. For example, client 404 supports an Extensible Markup Language (XML) format for sending and receiving content; client 406 supports an Extensible HyperText Markup Language (XHTML) format for sending and receiving content; client 408 supports a Scalable Vector Graphics (SVG) format for sending and receiving content; and client 410 supports a Wireless Markup Language (WML) format for sending and receiving content. Furthermore, each originating server 412, 414 and 416 may use and support a different data format from the others and from clients 404, 406, 408 and 410. For example, originating server 412 supports content in an XML format, originating server 414 supports content in DB2 format, and originating server 416 supports content in Hypertext Markup Language (HTML) format. DB2 is an IBM database product family. The DB2 family of relational database products offers open, industrial-strength database management for decision support, transactional processing, and an extensive range of business applications. The DB2 family spans a number of computer hardware and operating systems.

Transcoding proxy server 402 receives requests for content located on one of originating servers 412, 414 or 416 from one of clients 404, 406, 408 or 410. At the time transcoding proxy server 402 receives the request for content, it also receives information about the capabilities of client 404, 406, 408 or 410, including what data formats are acceptable. Furthermore, transcoding proxy server 402 may also query requesting client 404, 406, 408 or 410 to determine other information, such as whether a Portable Document Format (PDF) viewer is available. Transcoding proxy server 402 then translates the request from a format sent by client 404, 406, 408 or 410 to a format compatible with the particular originating server 412, 414 or 416, where the requested content is located. Transcoding proxy server 402 then receives the requested content in a format compatible with the particular originating server 412, 414 or 416 from which it came.

Transcoding proxy server 402 then determines an estimated amount of time it will take to transcode the content from the format provided by originating server 412, 414 or 416 to the format requested by client 404, 406, 408 or 410. Transcoding proxy server 402 then determines the amount of time needed to send a content analyzer, if needed, for the format type of the content as provided by originating server 412, 414 or 416. A content analyzer, also referred to as a content processor, is a piece of software that is used for viewing data on display or for analyzing data in some other way. Transcoding proxy server 402 determines the time required to send the data to requesting client 404, 406, 408 or 410 in the format type provided by originating server 412, 414 or 416. If transcoding proxy server 402 determines that an increase in speed would be gained by sending the content analyzer and the content in the format provided by originating server 412, 414 or 416, then transcoding proxy server 402 sends the content analyzer for the format provided by the originating server along with the content in the format provided by the originating server to requesting client 404, 406, 408 or 410. Requesting client 404, 406, 408 or 410 may then begin analyzing the content while proxy server 402 transcodes the content as provided by the particular originating server 412, 414 or 416 from which the content was requested, into the format requested by requesting client 404, 406, 408 or 410, thus reducing the time needed to process the requested content. Once transcoding proxy server 402 has completed transcoding the requested content, the requested content is sent to requesting client 404, 406, 408 or 410 in the format type requested by requesting client 404, 406, 408 or 410.

In this example, for convenience and to aid in describing the present invention, transcoding proxy server 402 is described in terms of transcoding (or converting) from one format into a client-requested data format. However, in most embodiments, the process typically involves conversions to various intermediate transcoded data formats before generating the output in the client-requested data format. Note that, instead of sending the content (and the appropriate content analyzer) from the origin server, the transcoding proxy server may perform the final transcoding in several steps and send any of the intermediate outputs in a similar manner. That is to say, the transcoding proxy server may transfer to the client any of the intermediate outputs and the associated content analyzer to the client.

The majority of formats currently in existence for data exchanges between computers via a network may be found by looking at the list of registered Multimedia Internet Mail Extension (MIME) types. MIME is a protocol that defines a number of content types and subtypes. This allows programs like web browsers to recognize different types for files and deal with them in the appropriate manner. The list of MIME types (registered and unregistered with standards bodies) can surpass hundreds if not thousands of types. Some typical MIME extensions, their types, and their subtypes are listed as follows: .txt—text/plain; .htm—text/HTML; .html—text/HTML; ps—application/postscript; eps—application/postscript; .pdf—application/PDF; .jpg—image/jpeg; gif—image/gif; .png—image/png; and .bmp—image/x-MS-bmp. The present invention is applicable with any of these and other MIME data types, including both those types that are registered with standards bodies and those that are not. Furthermore, the present invention is applicable with other data formats that are not defined as MIME types.

Figure 5:
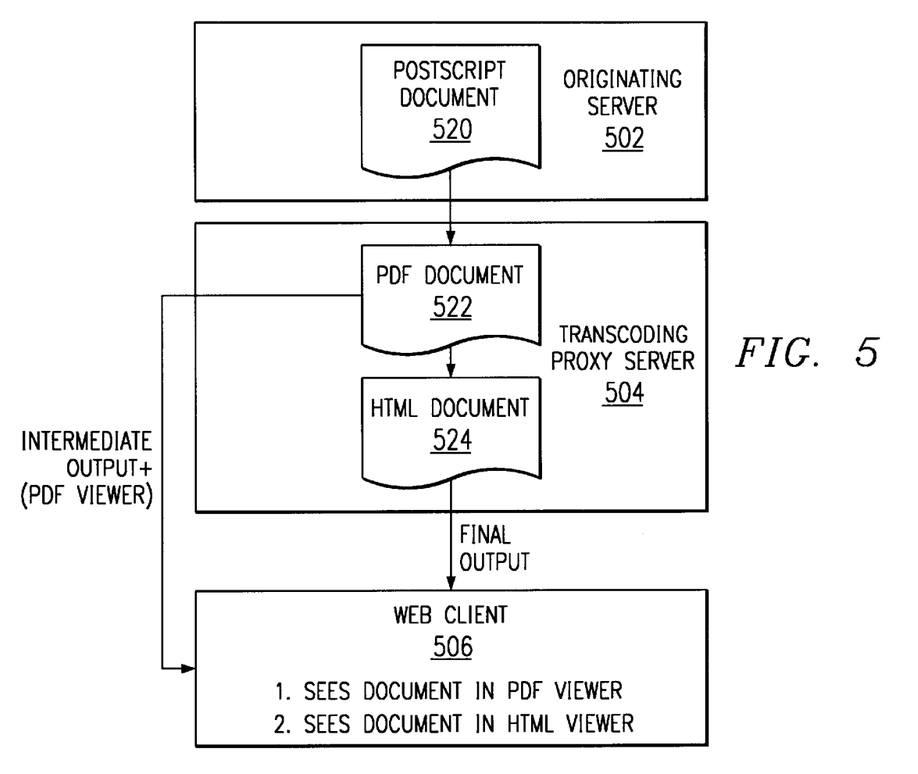
FIG. 5 is a block diagram illustrating the flow of data from the originating server through the transcoding proxy server to the client in accordance with the present invention.
Figure 6:
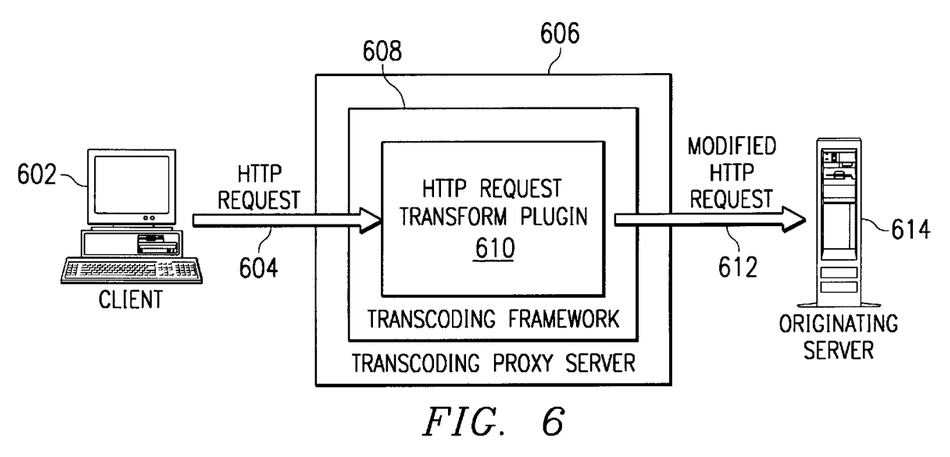
FIGS. 6 and 7 show block diagrams illustrating the data flow through a prior art transcoding proxy server.
Figure 7:
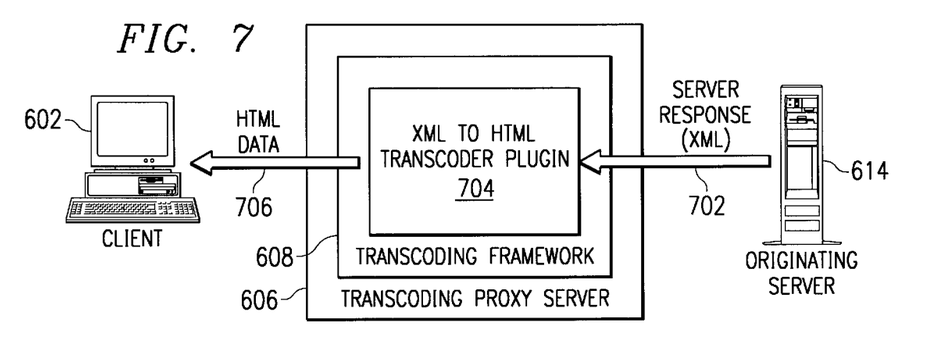

The details and functioning of the present invention may be more fully understood by contrasting FIG. 5 with FIGS. 6 and 7. Turning first to FIG. 5, there is shown a block diagram illustrating the flow of data from the originating server through the transcoding proxy server to the client in accordance with the present invention. In the depicted example, the client has requested the content to be sent in HTML format. However, the requested content is located on originating server 502 as postscript document 520.

Transcoding proxy server 504 receives postscript document 520 from originating server 502 and transcodes it into PDF document 522. In the present example, transcoding proxy server 504 has made the determination that an increase in speed in processing the content by the client will be obtained by sending a PDF viewer along with PDF document 522 to client 506 prior to or while transcoding proxy server 504 transcodes the PDF document into HTML document 524. Therefore, the PDF document, along with a PDF viewer, is sent to client 506. Client 506 is able to view the content, using the PDF viewer, while transcoding proxy server 504 continues to transcode PDF document 522 into HTML document 524. Once transcoding proxy server 504 has completed transcoding PDF document 522 to HTML document 524, HTML document 524 is sent to client 506 for viewing and final processing. Note that, if the PDF viewer were available with the client, the transcoding server would not send the PDF viewer to the client. The determination of whether a PDF viewer is available or not could be made from the client information or via standard techniques of content negotiation between the transcoding server and the client.

Turning now to FIGS. 6 and 7, there are shown block diagrams illustrating the data flow through a prior art transcoding proxy server. In FIG. 6, client 602 sends HTTP request 604 to transcoding proxy server 606. Transcoding proxy server 606 includes transcoding framework 608 for converting requests in one format to requests in a second format. Transcoding framework 608 includes HTTP request transform plugin 610 for converting HTTP request 604 received from client 602 into a modified HTTP request 612 compatible with originating server 614, where the requested content is located.

As shown in FIG. 7, transcoding proxy server 606 receives server response 702 in Extensible Markup Language (XML) data format. Transcoding framework 608 also includes XML to HTML transcoder plugin 704. XML to HTML transcoder plugin 704 converts server response 702 from XML data format to an HTML data format and sends HTML data 706 to client 602 for processing.

Following are some examples that will aid in understanding the principles of the present invention. In a first example, an origin server contains very large (i.e., 10000×10000 resolution) BMP format images (Bitmap format). The transcoding proxy server has a BMP to PNG format converter and a PNG to GIF format converter. (PNG and GIF are well known image formats.) A client has a GIF viewer and requests x.GIF. The transcoding proxy server obtains x.BMP from the origin server and starts converting x.BMP to x.PNG. The transcoding server then sends the PNG viewer and x.PNG to the client, while it is transcoding x.PNG to x.GIF. Upon completion of transcoding x.PNG to x.GIF, the transcoding server sends x.GIF to the client. Thus, the client is able to view the content of the image before the transcoding proxy server completes performing the transcoding.

In a second example, the client already has the PNG to GIF converter. The client requests x.GIF, and the transcoding proxy server obtains x.BMP from the originating server. The transcoding server then starts converting x.BMP to x.PNG. Once this is complete, the transcoding server sends the PNG viewer and x.PNG to the client, while it is transcoding x.PNG to x.GIF. The client sees x.PNG in the PNG viewer and also converts x.PNG to x.GIF, and then terminates the connection to the transcoding server. Thus, the client is able to view the content more quickly than waiting for the transcoding server to convert x.BMP to x.GIF.

Figure 8:
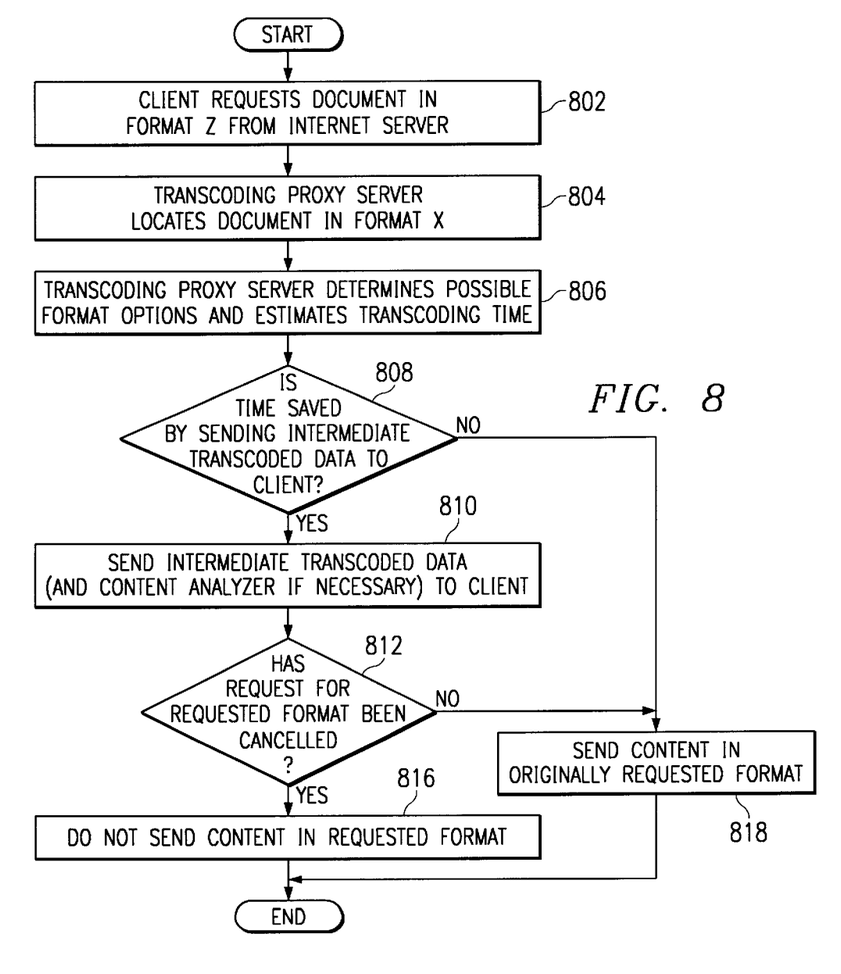
FIG. 8 is a flowchart illustrating a preferred method of operation of the transcoding proxy server in accordance with the present invention.

With reference now to FIG. 8, there is shown a flowchart illustrating a preferred method of operation of the transcoding proxy server in accordance with the present invention. Although the method is described with one intermediate format conversion in the transcoding proxy server, those of ordinary skill in the art will appreciate that the method may be altered somewhat when multiple intermediate format conversions are involved. However, such alterations may be made without departing from the spirit and scope of the present invention.

The method begins with a request by a client, such as data processing system 300, to the transcoding proxy server, such as transcoding proxy server 402, for a document in data format Z from an originating server, such as originating server 416 (step 802). The transcoding proxy server locates the document in data format X (step 804). The transcoding proxy server determines format options and estimates transcoding times and transmission times (step 806). In step 806, the transcoding proxy server determines that format X is to be transcoded to intermediate format Y and that format Y is to be transcoded to final format Z. Also in step 806, the transcoding proxy server estimates the time (T_xy) for transcoding format X to format Y, the time (T_yz) for transcoding format Y to format Z, the time (T_c) to send a content analyzer for format Y to the client, and the time (T_d) to send the transcoded data in format Y.

Based on the values of T_c, T_d, T_xy and T_yz and orders of execution, the transcoding proxy server makes a determination of whether to send the intermediate transcoded data and content analyzer for format Y to the client based on time saving considerations (step 808). One goal is for the transcoding proxy server to determine whether, for the particular document requested, it would gain performance advantage by adopting the proposed scheme. In the specific example given above, if (T_c+T_d) is less that T_yz, then, in many situations, it can be concluded by the transcoding proxy server that it is advantageous to send the intermediate data and the associated content processor to the client, while transcoding to the desired final format is proceeding. If the transcoding proxy server determines, via content negotiation or client-supplied information, that the client does not need the content analyzer for the intermediate data, then if T_d is less than T_yz, the transcoding proxy server does not send the intermediate data to the client.

Note that various modifications that include additional factors, like the time required to install a new content analyzer on the client computer or the time required to send the final transcoded output to the client, are possible and can be done by a person of ordinary skill in the art. To reiterate on the basis of the above example, if the transcoding proxy server determines that it would be advantageous to send the intermediate transcoded data (and content analyzer, if necessary, for the intermediate transcoded data) to the client, then once the client receives them, the client begins processing the document while awaiting the final format (step 810).

If the client has transcoders to perform conversions from the intermediate format to the final format, it does local transcoding of the intermediate format. If the local transcoding is completed before the final transcoded output of the transcoding proxy server arrives, the client may cancel the initial request. If the transcoding proxy server receives a request to cancel (step 812), then the transcoding proxy server quits the transcoding process and does not send the content in the requested format to the client (step 816).

If the original request is not cancelled (step 812) or if the transcoding proxy server determines not to send the intermediate transcoded data to the client (step 808), then the client receives the document in the originally requested format Z (step 818).

Figure 9:
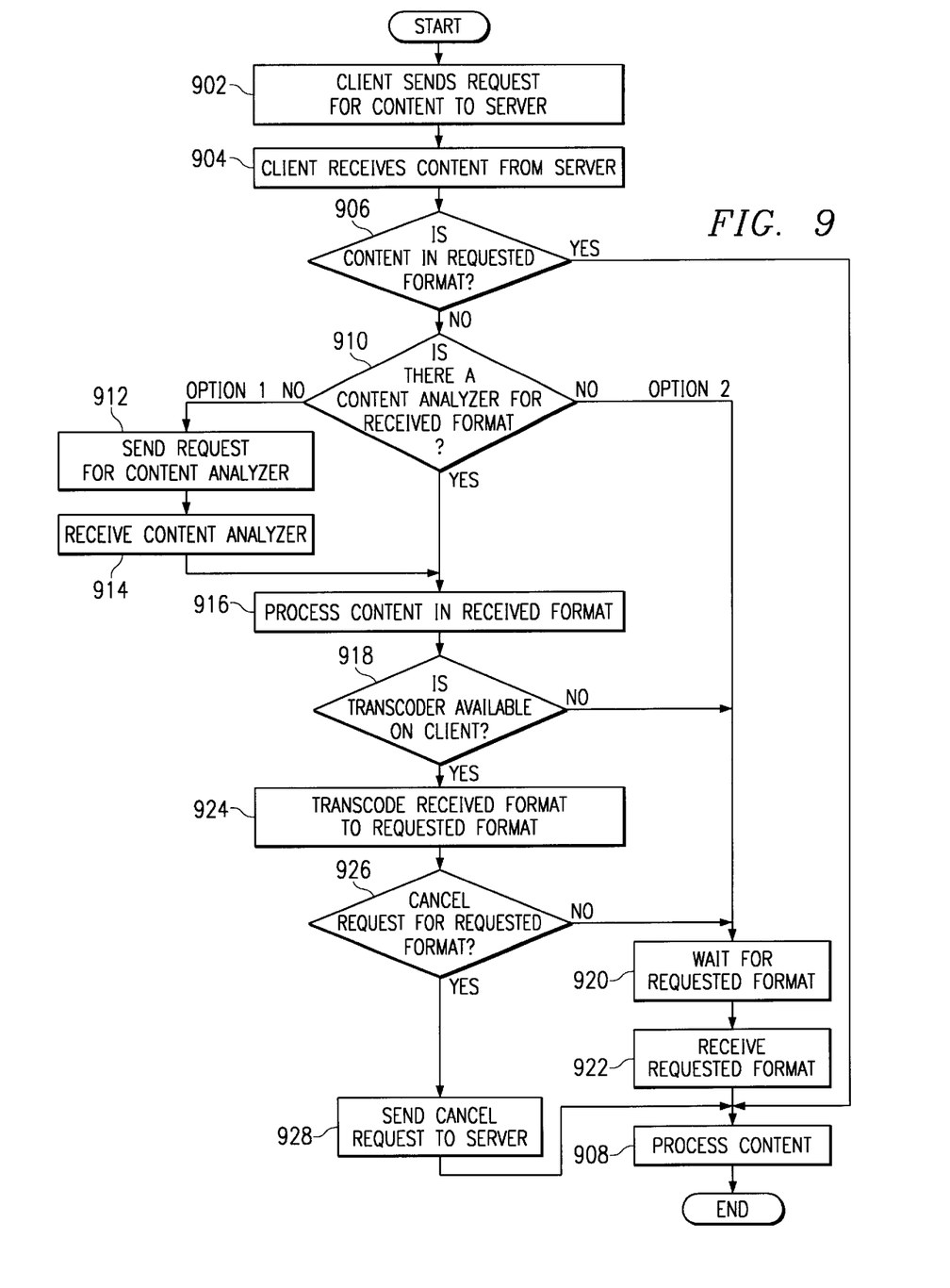
FIG. 9 is a flowchart illustrating a preferred method of operation of a client in accordance with the present invention.

Turning now to FIG. 9, there is shown a flowchart illustrating the operation of the client in accordance with the present invention. The process begins with the client sending a request for content in a requested format to a server (step 902). The client then receives the requested content from the server (step 904) and determines if the content received is in the requested format (step 906). If the content received is in the requested format, then the content is processed using a content analyzer existing and available on the client (step 908), and the process ends.

If the content received is not in the requested format, then the client determines whether a content analyzer for the received format is available (either because the client currently has one or because a content analyzer has been received along with the requested content) (step 910). If the client does not have a content analyzer for the received content, as a first option, it can send a request for the content analyzer (step 912), receive the content analyzer from the server (step 914), and process the content in the received format (step 916). As a second option, the client may simply wait for the requested format (step 920) and process the content (step 908) once it has received the content in the requested format (step 922), at which point the process ends.

If the client does have a content analyzer for the received format, it processes the content in the received format (step 916). The client then determines whether a transcoder is available on the client for transcoding from the received format into the requested format (step 918). If there is no such transcoder available, then the client waits for the requested format (step 920), receives the requested format (step 922), processes the content in the requested format (step 908), and then the process ends.

If there is a transcoder available on the client, then the client transcodes the content in the received format into the requested format (step 924). If the transcoding is completed before the content in the requested format is received from the server, then the client may cancel the request for the content in the requested format (step 926). If the client decides to cancel the request, then a cancellation request is sent to the server (step 928) and, at the same time, the client starts processing the content (which is now in the originally requested format) (step 908). At the end of processing the content, the process ends. Alternatively, if a cancellation request is not sent, then the client waits for the requested format (step 920) and processes the content in the requested format (step 908) once the requested format has been received (step 922), at which point the process ends.

It should be noted that, while the present invention has been described primarily with reference to conversions from an initial data format to a final data format, with one intermediate format, other possibilities exist as well. For example, the transcoding proxy server may transcode the content from an initial data format directly into the final data format and, if determined to be advisable, send the content to the client in the original data format, possibly along with a content analyzer for the initial data format, while transcoding takes place on the proxy server. As one of ordinary skill in the art will recognize, everything in this scenario is the same as the one intermediary scenario, except for the removal of the intermediary transcoding step.

Furthermore, the present invention may also be applied to multiple intermediary transcoding steps. For example, a client requests a document in data format Z. An originating server provides the document to a transcoding proxy server in format X. The transcoding proxy server takes X and coverts it to Y1, then to Y2, then to Y3, all the way to Yn, and then to Z. That is, there are multiple transcoding steps in the transcoding proxy server. Anytime the transcoding proxy server determines that it saves time, it sends the intermediate data format, whether it be Y1, Y2, etc. (and content processor if needed) to the client. The transcoding proxy server may determine that time may be saved because the content processor of Y1, Y2, Y3, etc., is available at the client or because sending the intermediate data content processor/analyzer can be done while transcoding to the final output is proceeding.

It should be noted that to convert N formats to M formats without intermediate converters requires on the order of N×M transcoders. However, if there is an intermediate format (for example, the document object model of the World Wide Web consortium), there could be transcoders to and from all formats to the Document Object Model. In this case, the transcoding step would be Format A to Document Object Model to Format B. Thus, only (M+N) order of transcoders are necessary for interconversions.

It should also be noted that, while the present invention has been described primarily with reference to a single transcoding proxy server, it is possible to utilize multiple transcoding proxy servers with multiple transcoding steps. Such modifications will be obvious to those of ordinary skill in the art upon reading the description above in conjunction with the figures.

It should be further noted that, while the present invention is herein described primarily with reference to content or image transcoding, other embodiments of the present invention are applicable to other types of transcoding as well. For example, the present invention may also be applied to device transcoding and protocol transcoding.

Device transcoding is the process of converting data to fit device characteristics. For example, a user might desire that HTML data with color images be converted to a Palmpilot format at 160×160 resolution and 2-bit grayscale format. Here, the 160×160 resolution conversion and the 2-bit grayscale conversion are examples of device transcoding. Such transcoders can also be split among transcoding servers and clients, e.g., the Palmpilot may have a program that converts color images to 2-bit grayscale, but not have the transcoder to convert to 160×160 resolution.

Protocol transcoding (e.g., conversion of various protocols to HTTP) may also be accomplished utilizing the processes and apparatus of the present invention. Such protocol conversions can also be done in multiple stages in a transcoding proxy server. The client is not just a computer which is asking for data for viewing, but could be a protocol converter that is asking the transcoding proxy server for assistance with protocol conversion.

The transcoding proxy server is presented herein primarily with reference to an intermediate transcoding proxy server as depicted in FIG. 4. This is the most commercially valuable implementation of the present invention because the transcoding proxy server can act as an intermediary through which all data involved in the transcoding process passes. Advertisements that are inserted into the transcoded content can earn revenue for the stand-alone transcoding proxy server. However, it should be noted that the transcoding proxy server could also potentially be located in the same web server (i.e., originating server) on which the content is located, and installed on top of the web server. In this particular case, there are two modes of operation. In one mode of operation, the transcoding proxy server transcodes data only for the web server on which it is located. In a second mode of operation, the transcoding proxy server transcodes data for the web server on which it is located and also for other web servers on which other data is located.

Although the present invention is described primarily with reference to "conventional" data processing systems, such as personal computers, the present invention is also applicable to other data processing systems and electronic devices. Some examples of other devices include personal digital assistants (PDAs), smart phones, screen phones, and voice-drive car browsers. These other devices vary in terms of their input and output interfaces, screen real estate, and processing capabilities. Transcoding is needed to tailor data to these constrained devices. As noted earlier, the transcoding proxy server receives information conveying the attributes and capabilities of the device requesting content from an originating server. With many of these other devices, such as smart phones, the device itself does not have enough processing power to send this information directly. Therefore, a Universal Resource Link (URL) to a web site containing device attributes is often sent to the transcoding proxy server instead.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as a floppy disc, a hard disk drive, a RAM, and CD-ROMs and transmission-type media, such as digital and analog communications links.

The description of the present invention is presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a data processing system for providing content from a distributed database to a client, comprising the steps of:

receiving, at a server, a request for content;

retrieving the content in a first format;

responsive to a determination that an increase in efficiency would be obtained by allowing the client to process the content in the first format prior to transcoding the content into a second format, sending the content to the client in the first format; and responsive to a determination that the client does not have content processing software for the first format, sending the content processing software for the first format along with the content in the first format.

2. The method as recited in claim 1, further comprising transcoding the content from the first format into the second format.

3. The method as recited in claim , further comprising sending the content in the second format to the client.

4. The method as recited in claim 3, further comprising, responsive to a determination that the client does not have a content analyzer for the second format, sending a content analyzer for the second format in the client.

5. The method as recited in claim 3, further comprising processing the content on the client while awaiting the content in the second format.

6. The method as recited in claim 2, further comprising, responsive to a request from the client canceling the request for the content in the second format, stopping the transcoding.

7. A computer program product in a computer readable media for use in a data processing system for providing content from a distributed database to a client, the computer program product comprising:

first instructions for receiving, at a server, a request for content;

second instructions for retrieving the content in a first format;

third instructions, responsive to a determination that an increase in efficiency would be obtained by allowing the client to process the content in the first format prior to transcoding the content into a second format, for sending the content to the client in the first format; and fourth instructions, responsive to a determination that the client does not have content processing software for the first format, for sending the content processing software for the first format along with the content in the first format.

8. The computer program product as recited in claim 7, further comprising fifth instructions for transcoding the content from the first format into the second format.

9. The computer program product as recited in claim 8, further comprising sixth instructions for sending the content in the second format to the client.

10. The computer program product as recited in claim 9, further comprising seventh instructions, responsive to a determination that the client does not have a content analyzer for the second format, for sending a content analyzer for the second format to the client.

11. The computer program product as recited in claim 9, further comprising seventh instructions for processing the content on the client while awaiting the content in the second format.

12. The computer program product as recited in claim 8, further comprising sixth instructions, responsive to a request from the client canceling the request for the content in the second format, for stopping the transcoding.

13. A system for providing content from a distributed database to a client, comprising:
   means for receiving, at a server, a request for content;
   means for retrieving the content in a first format;
   means, responsive to a determination that an increase in efficiency would be obtained by allowing the client to process the content in the first format prior to transcoding the content into a second format, for sending the content to the client in the first format; and
   means, responsive to a determination that the client does not have content processing software for the first format, for sending the content processing software for the first format along with the content in the first format.

14. The system as recited in claim 13, further comprising means for transcoding the content from the first format into the second format.

15. The system as recited in claim 14, further comprising means for sending the content in the second format to the client.

16. The system as recited in claim 15, further comprising means, responsive to a determination that the client does not have a content analyzer for the second format, for sending a content analyzer for the second format to the client.

17. The system as recited in claim 15, further comprising means for processing the content on the client while awaiting the content in the format.

18. The system as recited in claim 14, further comprising means, responsive to a request from the client canceling the request for the content in the second format, for stopping the transcoding.

19. A method in a data processing system for processing a request for a document, the method comprising the data processing system implemented steps of:
   receiving a request for a document from a client;
   obtaining the document in a first format; and
   responsive to a determination that the client is unable to process the document in the first format, sending a document in the first format with computer implemented instructions for processing the document in the first format.

20. The method of claim 19, further comprising:
   determining whether and increase on performance will occur at the client by sending the document in the first format with computer implemented instructions for processing the document in the first format; and
   responsive to a determination that an increase in performance will occur at the client, enabling the sending step.

21. The method claim 19, further comprising:
   transcoding the document into a second format; and
   sending the document to the client in the first format, wherein the computer implemented instructions will halt the processing of the document in the first format if the document is received by the client in the second format prior to completing processing of the document in the first format with the computer implemented instructions.

22. The method of claim 19, wherein the document in the first format is a postscript file.

23. The method of claim 19, wherein the document in the first format is an XML page, and wherein the document in the second format is an HTML page.

24. A data processing system for processing a request for a document, the system comprising:
   means for receiving a request for a document from a client;
   means for obtaining the document in a first format; and
   means, responsive to a determination that the client is unable to process the document in the first format, for sending a document in the first format with computer implemented instructions for processing the document in the first format.

25. The data processing system of claim 24, further comprising:
   means for determining whether an increase in performance will occur at the client by sending the document in the first format with computer implemented instructions for processing the document in the first format; and
   means, responsive to a determination that an increase in performance will occur at the client, for enabling the sending step.

26. The data processing system of claim 24, further comprising:
   means for transcoding the document into as second format; and
   means for sending the document to the client in the first format, wherein the computer implemented instructions will halt the processing of the document in the first format if the document is received by the client in the second format prior to completing processing of the document in the first format with the computer implemented instructions.

27. The data processing system of claim 24, wherein the document in the first format is a postscript file.

28. The data processing system of claim 24, wherein the document in the first is an XML page, and wherein the document in the second format is an HTML page.

29. A computer program product in a computer readable media for use in a data processing system for processing a request for a document, comprising:
   first instructions for receiving a request for a document from a client;
   second instructions for obtaining the document in a first format; and
   third instructions, responsive to a determination that the client is unable to process the document in the first format, for sending the document in the first format with computer implemented instructions for processing the document in the first format.

30. The computer program product of claim 29, further comprising:
   fourth instructions for determining whether an increase in performance will occur at the client by sending the document in the first format with computer implemented instructions for processing the document in the first format; and
   fifth instruction, responsive to a determination that an increase in performance will occur at the client, for enabling the sending step.

31. The computer program product of claim 29, further comprising:
   fourth instructions for transcoding the document into as second format; and
   fifth instructions for sending the document to the client in the first format, wherein the computer implemented instructions will halt the processing of the document in the first format if the document is received by the client in the second format prior to completing processing of the document in the first format with the computer implemented instructions.

32. A method in a data processing system for providing content from a distributed database to a client, comprising the steps of:

receiving, at a server, a request for content;

retrieving the content in a first format;

transcoding the content from the first format into at least one intermediate format;

transcoding the content form the intermediated format into the requested format; and responsive to a determination that an increase in efficiency would be obtained by allowing the client to process the content in the intermediated format prior to transcoding the content into the requested format, sending the content to the client in the intermediate format.

33. The method as recited in claim 32, further comprising sending the content in the requested format to the client.

34. The method as recited in claim 32, wherein the at least one intermediate format is a plurality of intermediate formats, and further comprising, responsive to a determination that an increase in efficiency would be obtained by allowing the client to process the content in any of the intermediated formats prior to transcoding the content into the requested format, sending the content to the client in one of the intermediated formats.

35. The method as recited in claim 32, further comprising transcoding the content from the intermediate format into the requested format on the client machine.

36. The method as recited in claim 35, further comprising canceling the request to the server for the content in the requested format if the transcoding on the client machine is completed prior to receiving the content in the requested format from the server.

* * * * *

UNITED STATES PATENT AND TRADEMARK OFFICE
CERTIFICATE OF CORRECTION

PATENT NO. : 6,615,212 B1
DATED : September 2, 2003
INVENTOR(S) : Dutta et al.

It is certified that error appears in the above-identified patent and that said Letters Patent is hereby corrected as shown below:

Title page, Item [54] and Column 1, lines 1-4,
Title, delete "DYNAMICALLY PROVIDED CONTENT PROCESSOR FOR TRANSCODED DATA TYPES AT INTERMEDIATE STAGES OF TRANSCODING PROCESS" and insert -- PROCESSING DATA IN A DISTRIBUTED DATABASES FOR TRANSCODING SERVER TRANSCODES THE CONTENT FROM FIRST FORMAT TYPE INTO SECOND FORMAT TYPE AND SEND CONTENT IN SECOND FORMAT TO CLIENT --.

Column 12,
Line 21, after "claim" insert -- 2 --.
Line 26, after "format", delete "in" and insert -- to --.

Column 13,
Line 31, after "in the" insert -- second --.
Line 47, after "whether", delete "and increase on" and insert -- an increase in --.
Line 54, after "method" insert -- of --.

Column 14,
Line 35, after "first" insert -- format --.
Line 56, after "fifth", delete "instruction" and insert -- instructions --.

Column 15,
Line 12, after "content", delete "form the intermediated" and insert -- from the intermediate --.
Line 16, after "in the", delete "intermediated" and insert -- intermediate --.

Column 16,
Line 8, delete "intermediated" and insert -- intermediate --.

UNITED STATES PATENT AND TRADEMARK OFFICE
CERTIFICATE OF CORRECTION

PATENT NO.  : 6,615,212 B1
DATED       : September 2, 2003
INVENTOR(S) : Dutta et al.

It is certified that error appears in the above-identified patent and that said Letters Patent is hereby corrected as shown below:

Column 16 (cont'd),
Line 10, after "of the", delete "intermediated" and insert -- intermediate --.

Signed and Sealed this

Fourth Day of May, 2004

JON W. DUDAS
*Acting Director of the United States Patent and Trademark Office*